Figure 1:
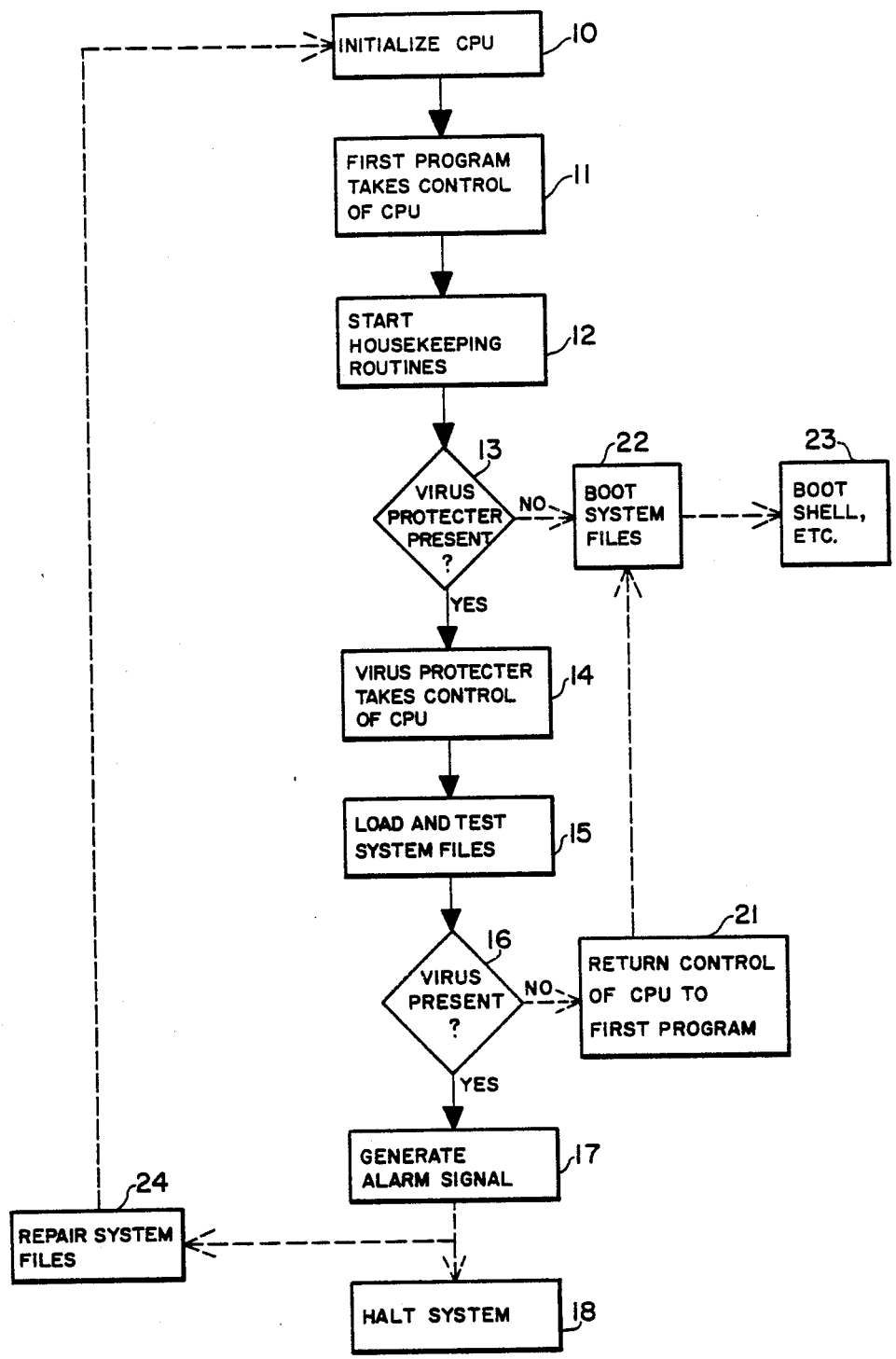

United States Patent [19]

Lentz

[11] Patent Number: 4,975,950
[45] Date of Patent: Dec. 4, 1990

[54] SYSTEM AND METHOD OF PROTECTING INTEGRITY OF COMPUTER DATA AND SOFTWARE

[76] Inventor: Stephen A. Lentz, 5726 N. 10th St. #11, Phoenix, Ariz. 85014

[21] Appl. No.: 266,710

[22] Filed: Nov. 3, 1988

[51] Int. Cl.⁵ .............................................. H04L 9/00
[52] U.S. Cl. ..................................... 380/4; 364/269.4
[58] Field of Search ............... 380/4, 24, 25; 364/200, 364/900

[56] References Cited
PUBLICATIONS

Computers and Security, vol. 7, No. 2 (4/88), Highland, pp. 157–163.

Computers and Security, vol. 7, No. 3, (6/88) Highland, pp. 239–242.

*Primary Examiner*—Salvatore Cangialosi
*Attorney, Agent, or Firm*—Fulwider Patton Lee & Utecht

[57] ABSTRACT

System and method for preventing alteration of stored data by computer virus. In a computer system which normally automatically boots an operating system when the central processing unit is initialized, a device is provided which takes control of the central processing unit before boot-up, checks the system files for computer virus and generates an alarm signal if a virus is detected.

In the preferred embodiment, the device quarantines an infected operating system to prevent alteration.

2 Claims, 2 Drawing Sheets

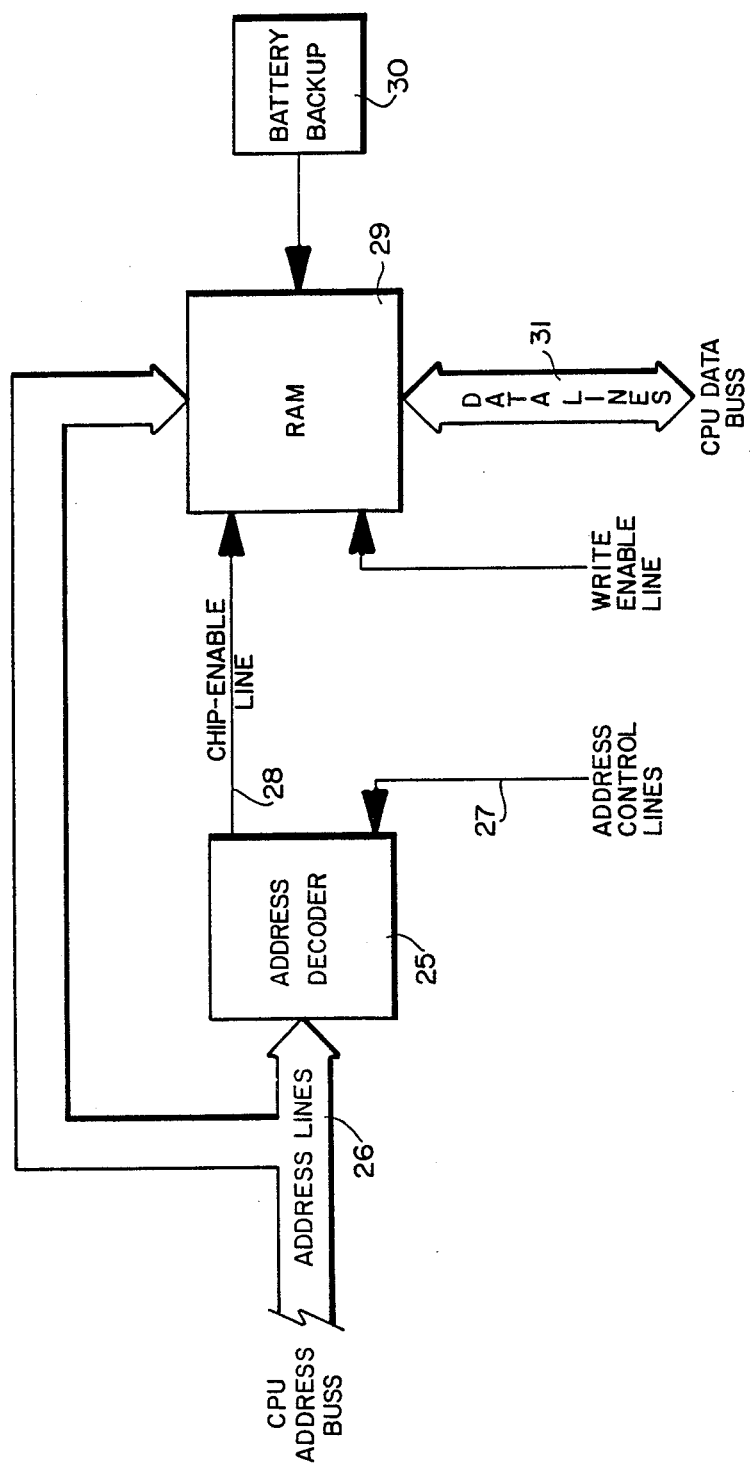

SYSTEM AND METHOD OF PROTECTING INTEGRITY OF COMPUTER DATA AND SOFTWARE

This invention relates to computer systems.

More particularly, the invention concerns improved methods and systems for combatting computer virus.

In a further and more particular respect, the invention relates to such systems and methods for preventing alteration of stored files.

The problems caused by so-called "computer virus" and various attempts to prevent these problems have been described in a number of recent publications. For example, see Time Magazine, pp. 62–67 (Sept. 26, 1988), Business Week, pp. 64–72 (Aug. 1, 1988), PC Magazine pp. 33–36 (June 28, 1988), Varbusiness p. 81 (June 1988), Varbusiness p. 80 (August 1988), BYTE pp. 197–200 (July 1988), Mid-Atlantic Tech pp. 7 et seq (June 13, 1988) and Mid-Atlantic Tech pp. 7–8 (July 12, 1988).

Briefly, "computer virus" is a program which carries in its instructional code the recipe for making perfect copies of itself. Lodged in a host computer system, a typical virus takes temporary control of the Central Processing Unit and, while in control, should the infected computer system fuel other storage media, a copy of the virus may be inserted into that storage media. Then whenever the infected computer system comes into contact with a new piece of software, a copy of the virus is inserted into the new software. Thus, the infection can be spread from computer system to computer system by unsuspecting users who trade memory disks or who send programs to one another via modems or other inputs. Once a virus program is resident in a computer system, it then has the capability of altering stored data in the system storage memory. These alterations may cause a range of results which can vary from simple "pranks" (temporarily halting execution of the infected software or humorous screen displays) to outright destruction of the computer system. Thus the computer virus has potentially disastrous results, particularly if spread into and among the users of vital multi-user computer systems, e.g., financial systems, National security systems and the like. At the very least, computer virus has the potential for causing huge expenditures of money and time to recapture, restore or reproduce destroyed data files in the storage memories of both commercial and personal computer system users.

Significant expenditures of time and money and the attention of highly skilled workers in the art have, thus far, failed to provide complete solutions to the problem of computer virus. To date, the best approach which the art has developed is a so-called "software" solution called a "shell" which prevents entry of a virus program into the DOS program, see e.g., the Mid-Atlantic article mentioned above dated July 12, 1988. However, the software shell is only a partial and incomplete solution, because the shell only prevents running an infected program if the shell has taken control of the Central Processing Unit. The shell does not prevent running programs from other inputs, e.g., floppy disks, modems, etc.

Therefore, it would be highly advantageous to provide improved apparatus and methods for preventing alteration of stored data in a computer system by system files which are infected with computer virus.

Still another object of the invention is to provide such virus-proof apparatus and methods which quarantine an infected program, to prevent spread of the program to other computer systems and programs.

These, other and further objects and advantages of the invention will be apparent to those skilled in the art from the following detailed description thereof taken in conjunction with the drawings in which:

FIG. 1 is a program logic diagram illustrating the presently preferred practice of the invention; and FIG. 2 is a circuit diagram illustrating various components and their inter-connections which may be used to implement the invention in accordance with the presently preferred embodiment thereof.

Briefly, in accordance with one embodiment of the invention, I provide improvements in present computer systems. Such systems include a central processing unit (CPU), a main memory having a resident first program for controlling the CPU, a storage memory having resident data and a resident second program for interfacing the storage memory with the system and means for sequentially normally automatically transferring the second program to the main memory when the central processing unit is initialized and for transferring control of the central processing unit to the second program.

The improvements which I provide comprise means for sequentially preventing transfer of control of the central processing unit to the second program, checking the second program to detect the presence of any computer virus and generating an alarm signal if such virus is detected.

As used herein, the term "computer virus" includes both the unauthorized programs described in the above-referenced journal articles and any other unauthorized programs which might be deliberately introduced directly into the system files, e.g., by "hackers", etc., as well as alterations or damage to the system files which are caused by fortuitous events, e.g., power flickers or surges, rfi, EMP, etc.

As will appear more fully below, the system and methods of the invention are expected to be used in conjunction with other protection measures and additional utilities can be combined with my invention to further enhance its utility. For example, once the system and methods of the present invention have been employed to prevent booting of infected or otherwise altered system files, it is contemplated that an appropriate shell program will be provided for protection after control of the CPU has been passed to the second program. Similarly, if the system and methods of the invention detect an infected or altered system file, causing an alarm to be generated, it is contemplated that utilities be provided for repairing the system files. Further, in multiple-user situations, it is contemplated that the present invention can be combined with usual password and password changing systems to provide still additional security. Such further steps and procedures beyond the alarm or beyond the booting of system files which have been confirmed to be uninfected or unaltered, are, however, optional and will be apparent to those skilled in the art.

Turning now to the drawings which are intended to illustrate the priniciples of the invention in accordance with the presently preferred embodiment thereof and which do not limit the scope of the invention, FIG. 1 is a logic flow diagram which illustrates the protection and steps of the invention. For example, with reference to a conventional personal computer such as IBM ® PC, inital power-up or reset causes initialization of the CPU 10 and the first program, resident in the on-board ROM takes control of the CPU 11. The first program starts through its normal housekeeping routines 12 which includes a scan 13 for additional ROM modules. If a virus protector board (see FIG. 2) is detected, the virus protector takes control of the CPU 14. The ROM routine of the virus protector causes the loading and testing of the system files 15. If the test 16 detects the presence of computer virus, an alarm signal is generated 17.

Optional logic steps and procedures are illustrated by the dashed lines. Thus, if no virus is detected by the test 16, control of the CPU can be returned to the first program 21. If no virus protector ROM module is detected at the test 13, the first program will cause boot up of the system files 22. This also occurs when the test 16 confirms that no virus is present and CPU is returned to the first program 21. On boot up of the system files 22, a shell program can be booted 23 which protects the system against attempts to run unauthorized programs. Similarly, after the alarm signal is generated 17 the logic can cause the system to halt execution of any further programs and routines can be provided to repair the infected system files 24.

Referring to FIG. 2, a circuit is depicted which shows the presently preferred implementation of the invention in a typical computer, e.g., the IBM ® PC. An address decoder chip 25 decodes the address lines 26 from the CPU address buss and also decodes the control lines 27. The address decoder 25 sends a signal via the chip-enable line 28 to ram chip 29 provided with a backup battery 30. Address lines 26 and data lines 31 also communicate with the ram chip 29. The ram chip 29 is provided with an appropriate software program to effect the logic steps of FIG. 1. This system enables the ram to be read or written to, e.g., the first time when pure DOS is read into its memory storage.

The program in ram 29 prevents transfer of control of the system to the DOS program (see FIG. 1). The routines in the logic of FIG. 1 which accomplish the testing of the system files to detect a virus can include any of the suitable known techniques for checking file integrity. For example, in the presently preferred embodiment the check includes varification of file size, file checksum and file signature. If any of these tests are not satisfied, the test routine causes the generation of an alarm signal. This alarm signal can be visual, audible or, as in the presently preferred embodiment, an electrical signal in the form of software commands which disable the keyboard and place the system at an endless loop.

As will be apparent to those skilled in the art, the circuitry of FIG. 2 can be built into the computer system as manufactured and sold by the OEM. Alternatively, for use in existing computer systems, e.g., the IBM ® PC, the circuitry can be provided as a conventional ROM module card.

Having described my invention in such terms as to enable those skilled in the art to understand and practice it, and having identified the presently preferred embodiments thereof, I claim:

1. In a computer system, said system including
   a central processing unit,
   a main memory, having resident therein
      a first program for controlling said central processing unit,
   a storage memory, having resident therein
      a second program for interfacing said storage memory with said system, and
      data, and
   means for sequentially
      normally automatically transferring said second program to said main memory in response to initializing the central processing unit, and
      transferring control of said central processing unit to said second program
   the improvements in said computer system comprising means for sequentially:
      (a) preventing said transfer of control;
      (b) checking said second program to detect said virus; and
      (c) generating an alarm signal if said virus is detected.

2. A method of operating a computer system which includes
   a central processing unit,
   a main memory, having resident therein
      a first program for controlling said central processing unit,
   a storage memory, having resident therein
      a second program for interfacing said storage memory with said system, and
      data, and
   means for sequentially
      normally automatically transferring said second program to said main memory in response to initializing the central processing unit, and
      transferring control of said central processing unit to said second program,
   said method comprising the steps of sequentially:
      (a) preventing said transfer of control;
      (b) checking said second program to detect said virus; and
      (c) generating an alarm signal if said virus is detected.

* * * * *